May 15, 1934.   J. HOLT   1,959,079
PIPE JOINT
Filed Oct. 18, 1933

Inventor

John Holt

By Steward & McKay
his Attorneys

Patented May 15, 1934

1,959,079

UNITED STATES PATENT OFFICE 1,959,079

PIPE JOINT

John Holt, Streetly, Sutton Coldfield, England, assignor to Imperial Chemical Industries Limited, a corporation of Great Britain Application October 18, 1933, Serial No. 694,161
In Great Britain April 19, 1932

2 Claims. (Cl. 285—122)

This invention relates to an improved pipe joint or coupling which is especially adapted for coupling light copper or brass tubes as used for example in household hot and cold water supply systems, the said joint being of the type in which the spigot member of the coupling has an internal liner of soft metal or other suitable material which is pressed on to the pipe by the socket member of the coupling.

The principal object of the present invention is to provide a pipe joint of the kind described such that a large bearing surface is obtained between the soft metal liner and the tube or pipe, thus eliminating the possibility of leakage due to an inherent difficulty with all joints of this type which make use of a small area of contact. This difficulty is due to the fact that the compressive force which is required to make a tight joint is usually great enough to cut or deform the inserted tube, and although such a joint is often tight when initially made it is a difficult matter satisfactorily to remake the joint, as the contact surfaces do not register the same as originally.

A further object of this invention is to extend the soft metal liner in such a manner that the compressive force can be applied direct to the liner instead of through a spigot of harder metal. This improvement eliminates the necessity of applying sufficient force to compress the hard metal spigot and therefore allows a tight joint to be made with less force.

A still further object of this invention is to fit the soft metal liner in the end of the metal coupling in such a manner that there is no possibility of leakage between the liner and the coupling, while at the same time preventing any possibility of the liner coming adrift from the fitting either through repeated breaking and making of the joint or as a result of excessive internal pressure.

According to the present invention I permanently fix a liner of soft metal or other suitable material into the end of the spigot member of the coupling, which is made of harder metal, a portion of the length of the liner being enclosed by the spigot, and the other portion projecting beyond the end of the spigot and being tapered to form a seat to engage with a tapered surface formed within the socket member of the coupling. The seat need not be strictly conical, for example it may be curved convexly. The same applies to the tapered surface within the socket member.

The liner is preferably located in a recess at the mouth of the spigot member and is tightly retained in position, for example by pressing the walls of the recess inwardly so as permanently to grip the liner. The concealed outer surface of the liner may also be slightly tapered so that when the liner is placed in position with its larger end at the bottom of the recess, the walls of the recess may be pressed inwardly to grip the liner. Still another way of securing the liner is to expand the same into the recess, which may be provided with one or more projections or ridges on its surface to anchor the liner.

When the socket member is tightened, pressure is exerted longitudinally on the tapered portion of the liner and also on the opposite end of the liner thus forcing the liner hard up against its seat and preventing leakage between the coupling and the liner, and also laterally compressing the liner to reduce its diameter and to bring the whole of its internal surface into contact with the loosely inserted tube.

A preferred embodiment of the invention is illustrated in the annexed drawing.

Figure 1:
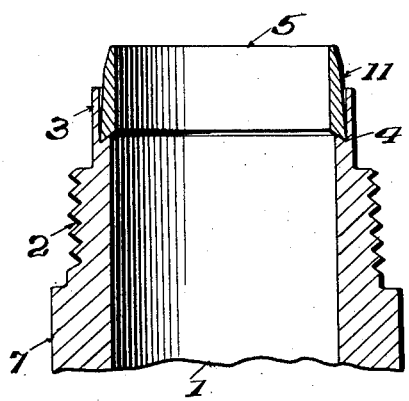
Figure 1 is a section through the end of the spigot member of a coupling showing the soft metal liner loosely placed in position ready for the fixing operation.
Figure 2:
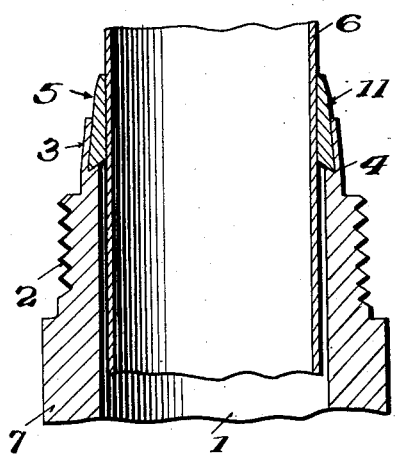
Figure 2 is a section similar to that of Figure 1, showing the liner fixed to the spigot member and a tube loosely inserted in readiness for making the joint.
Figure 3:
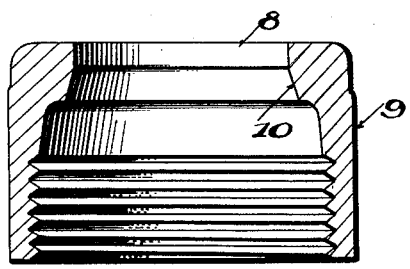
Figure 3 is a section of the socket member or compression nut.

Referring to the drawing, the spigot member 1, of material such as brass, is provided with a screwed portion 2 and a thin spigot 3. The metal near the bottom end of the spigot is machined to form a seat 4 for the lower end of a soft copper liner 5 and when the latter is pressed into position the end of the spigot is compressed by means of suitable tools firmly to secure the liner. The tube 6, of slightly smaller diameter than the internal diameter of the liner, is inserted into the fitting to the desired extent after the compression nut 8 has been threaded on to the tube. To make the joint the compression nut is screwed on to the threaded portion 2 and the hexagonal portion 7 of the coupling is held while the nut is tightened by means of the hexagonal portion 9 so that the conical surface 10 of the nut presses on the tapered portion 11 of the liner 5. The pressure thus brought to bear on the liner reduced its diameter and presses it tightly against the tube. The contact pressure at the mouth of the liner is greater than at the other end.

In actual practice the parts are proportioned in such a manner that the maximum pressure comes on the tapered mouth of the liner and that the pressure is gradually diminished towards the other end.

With pipe joints made according to this invention it is possible to make perfectly water or gas tight joints in a simple and rapid manner without having to apply a great deal of force and without calling for any special skill or care on the part of the workman. The same joints can be made over and over again without requiring any new parts, as the compressive force is exerted over such a large area that there is no tendency for the liner to cut into or deform the pipe. Fittings made in accordance with my invention can be used for high pressure oil or other high pressure fluid or gas systems such as instrument and pressure gauge piping in the chemical or oil manufacturing industries.

Fittings made in accordance with the invention have a minimum number of parts as the liner is for practical purposes integral with the coupling.

I claim:

1. A pipe joint or coupling comprising a spigot member bored so as to be a sliding fit on the pipe to be joined and provided at the mouth with a recess having an acute angle seating, a socket member having an internal tapered portion, and an internal liner of relatively soft material permanently fitted into the recess at the end of the relatively hard spigot member, a portion of the length of the liner being enclosed by the spigot member and the other portion projecting beyond the end of the spigot member and being externally tapered to form a seat, the tapered portion of said socket member engaging the tapered portion of the said liner and compressing it on to said pipe and tightly pressing said liner into the seating in said spigot member.

2. A pipe joint or coupling comprising a spigot member bored so as to be a sliding fit on the pipe to be joined, a socket member having a tapered surface formed therewithin, and an internal liner of relatively soft material having external and internal tapered portions permanently fitted into an internal recess formed at the mouth of said spigot member, said recess having tapered portions corresponding with the tapered portions of said liner and cooperating therewith to provide a seating for said liner, the tapered surface of said socket member engaging the external tapered portion of said liner to compress said liner against said pipe and to force the liner against its seating.

JOHN HOLT.